United States Patent [19]
Bening et al.

[11] Patent Number: 5,486,568
[45] Date of Patent: Jan. 23, 1996

[54] PROTECTED FUNCTIONAL INITIATED POLYMERS CAPPED WITH LOW SURFACE ENERGY FLUOROCARBONS

[75] Inventors: Robert C. Bening, Katy; David J. St. Clair, Houston, both of Tex.

[73] Assignee: Shell Oil Company, Houston, Tex.

[21] Appl. No.: 359,805

[22] Filed: Dec. 20, 1994

[51] Int. Cl.$^6$ .................................................. C08F 8/18
[52] U.S. Cl. .................. 525/102; 525/332.8; 525/332.9; 525/333.1; 525/333.2; 525/359.3; 526/82; 526/84
[58] Field of Search ................. 526/82, 84; 525/102, 525/359.3

[56] References Cited

U.S. PATENT DOCUMENTS

| | | | |
|---|---|---|---|
| 5,061,759 | 10/1991 | Tommasi et al. | 525/359.3 |
| 5,300,587 | 4/1994 | Mascia et al. | 525/359.3 |
| 5,331,058 | 7/1994 | Shepherd et al. . | |

FOREIGN PATENT DOCUMENTS

| | | |
|---|---|---|
| 2241239 | 2/1991 | United Kingdom . |
| 9112277 | 2/1991 | WIPO . |

OTHER PUBLICATIONS

J. M. DeSimone, Hunt, Belu, Linton, End–Functionalized Polymers. 1. Synthesis and Characterization of Perfluoroalkyl–Terminated Polymers via Chorosilane Derivatives, 1993, pp. 4854–4859.

*Primary Examiner*—Bernard Lipman
*Attorney, Agent, or Firm*—Keith M. Tackett

[57] ABSTRACT

The capping of anionic polymers to make functionalized polymers is used to make heterotelechelic polymers by using a protected functional initiator to polymerize a polymer comprising a conjugated diene and then capping the polymer with low surface energy fluorocarbons. The protected functional groups are stable under a variety of conditions and then readily convert to more reactive terminal functional groups useful for making sealants, coatings, molded or extruded goods and fibers having low surface energy.

6 Claims, No Drawings

PROTECTED FUNCTIONAL INITIATED POLYMERS CAPPED WITH LOW SURFACE ENERGY FLUOROCARBONS

FIELD OF THE INVENTION

This invention relates to preparation of functionalized polymers used as components in sealants, coatings, molded or extruded goods, and fibers. More specifically, this invention relates to capping of living anionic polymers to add terminal functional groups.

BACKGROUND OF THE INVENTION

Anionic polymerization of conjugated dienes with lithium initiators, such as sec-butyllithium, and hydrogenation of residual unsaturation has been described in many references. The capping of mono-initiated and di-initiated living anionic polymers to form functional end groups is described in U.S. patent application Ser. No. 938,917 filed Aug. 31, 1992 (T3229).

Anionic polymerization using protected functional initiators having the structure $R^1R^2R^3Si$—O—A'—Li is described in U.S. Pat. No. 5,331,058 wherein $R^1$, $R^2$, and $R^3$ are preferably alkyl, alkoxy, aryl, or alkaryl groups having from 1 to 10 carbon atoms, and A' is preferably a branched or straight chain bridging group having at least 2 carbon atoms. Polymerization with such a protected functional initiator, followed by capping to produce a second terminal functional group, produces difunctional polymers which sometimes can be prepared by capping polymers prepared with difunctional initiators such as 1,4 dilithiobutane and lithium naphthalide. Moreover, the use of a protected functional initiator permits formation of heterofunctional polymers having at least two different terminal functional groups on each difunctional molecule.

A preferred way to prepare difunctional polymers is to use a protected functional initiator having the structure:

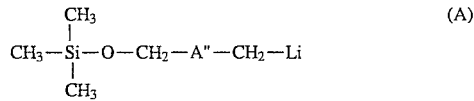

wherein A" is cyclohexyl or —CR'R"—, wherein R' is a linear alkyl having from 1 to 10 carbon atoms and R" is hydrogen or a linear alkyl having from 1 to 10 carbon atoms. The compounds of structure (A) initiate polymerization of conjugated monomers at moderate polymerization temperatures. The protected functional group survives hydrogenation of conjugated diene polymers and is readily removed by hydrolysis in the presence of methanesulfonic acid. The initiators of structure (A) can be used to make telechelic polymers by capping with ethylene oxide or oxetane.

A recent publication by J. M. DeSimone et al, *Macromolecules*, 26, 4854, 1993, describes the preparation of butadiene polymers capped with a perfluoroalkylchlorosilane identified as 1H,1H,2H,2H-perfluorooctyldimethylchlorosilane which gives high capping efficiency. This paper describes the expected improvement in surface properties that can be achieved by blending this material with conventional polymers.

SUMMARY OF THE INVENTION

The present invention is functionalized, mono-initiated anionic polymers having both a protected reactive functional group and a low surface energy fluorocarbon group on the terminal ends of the polymer molecules. These heterotelechelic polymers are produced by initiating polymerization with a protected functional initiator and then capping the polymer with a low surface energy fluorocarbon. The polymers of the invention possess a reactive group which allows them to be chemically reacted into thermoset systems such as polyurethanes. This retards loss of the desired surface properties do to extraction of the fluorocarbon-containing material or migration of the fluorocarbon block from the surface. The low surface energy fluorocarbon is preferably added by reaction with a perfluoroalkylchlorosilane, but can be added by reaction with a perfluoroalkylalkoxysilane, a perfluoroketone or a perfluoroaldehyde if sufficiently high capping efficiency can be achieved.

DETAILED DESCRIPTION OF THE INVENTION

Anionic polymerization of conjugated dienes and other unsaturated monomers using protected functional initiators having the structure $R^1R^2R^3Si$—O—A'—Li is described in U.S. Pat. No 5,331,058 wherein $R^1$, $R^2$, and $R^3$ are preferably alkyl, alkoxy, aryl, or alkaryl groups having from 1 to 10 carbon atoms, and A' is preferably a branched or straight chain bridging group having at least 2 carbon atoms.

A preferred protected functional initiator for making homopolymers of conjugated dienes and block or random copolymers of conjugated dienes and vinyl aromatic compounds has a trimethyl silyl protecting group with the structure:

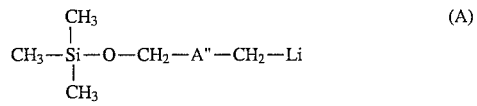

wherein A" is cyclohexyl or —CR'R" —, wherein R' is a linear alkyl having from 1 to 10 carbon atoms and R" is hydrogen or a linear alkyl having from 1 to 10 carbon atoms.

The compounds of structure (A) initiate polymerization of conjugated diene monomers such as butadiene and isoprene at moderate polymerization temperatures. The protected functional group survives hydrogenation of conjugated diene polymers and is readily removed by hydrolysis in the presence of methanesulfonic acid.

The polymers of the present invention include both the protected functional group, or a derivative thereof, from the protected functional initiator, and a low surface energy fluorocarbon group from a fluorocarbon capping agent such as a perfluoroaldehyde, a perfluoroketone, or a perfluoroalkylsilane. The perfluoroalkylsilanes are preferred and have the following structure:

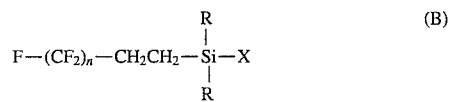

wherein n is a number from 1 to 10, preferably 3 to 8, R is an alkyl group containing from 1 to 6 carbons, and X is selected from a group that is reactive with polymer anions, the group consisting of halides, excluding fluoride, and acidic alkoxy radicals, such as phenoxy or 2,2,2-trifluoroethoxy. The preferred perfluoroalkylchlorosilanes provide high capping efficiency.

The addition of polymer anions to fluorocarbon ketones is generally prone to side reactions, such as coupling of the polymer chains, and the perfluoroaldehydes are only commercially available as the hydrate (hemiacetal). Dehydration of the perfluoroaldehyde hydrate is difficult and any of the product that remains in the hydrated form terminates the anionic polymer, rather than adding a fluorocarbon group, resulting in lower capping efficiency.

When the polymer products are to be hydrogenated, it is most preferred to use the alkoxysilane rather than the halosilane, since the lithium alkoxide by-products from the former are generally less deleterious to the hydrogenation than the lithium halide by-products from the latter. In order to achieve efficient capping, it is desirable to choose an alkoxy substituent such that the corresponding alcohol is fairly acidic. Efficient capping of anionic polymers by phenoxy or 2,2,2-trifluoroethoxy silanes (X=$OC_6H_5$ or $OCH_2CF_3$ in Structure B, respectively) has been described in U.S. patent application Ser. No. 330,054, filed Oct. 27, 1994 (TH0152) which is incorporated by reference herein. Alternately, if the chlorosilane is used, the polymer cement may be washed with dilute aqueous acid to remove the LiCl by-product, and dried prior to hydrogenation. Drying may be accomplished by removing the solvent and redissolving the polymer, or by contacting the cement with a drying agent.

The protected functional initiators are prepared as described in U.S. Pat. No. 5,331,058 which description is incorporated by reference herein. A variety of processes for removal of the protecting groups are known; for a review, see T. W. Greene, "Protective Groups in Organic Synthesis", J. Wiley and Sons, New York, 1981, incorporated herein by reference. A preferable process would involve easily handled, relatively low toxicity, and inexpensive reagents. In a preferred process, the preferred trimethyl silyl group is removed by reaction of the polymer solution with 1–10 equivalents (basis silyl end groups) of a strong organic acid, preferably methanesulfonic acid (MSA), in the presence of 0.1%–2% by weight of water and 5%–50% by volume of isopropanol (IPA) at about 50° C.

Polymerization is preferably initiated at a temperature from 20° C. to 60° C. most preferably from 30° C. to 40° C. It is generally advisable to keep the polymerization temperature below about 100° C.; above this temperature, side reactions that change microstructure and limit capping efficiency may become important. Polymerizations can be carried out over a range of solids, preferably from about 5% to about 80%, most preferably from about 10% to about 40%. For high solids polymerizations, it is preferable to add the monomer in increments to avoid exceeding the desired polymerization temperature. If the initiator is to be added to the full monomer charge, it is preferable to run the polymerization between 10% and 20% solids.

The low surface energy group is introduced by reacting 1.05–2 equivalents of the capping agent of structure (B) per lithium site at a temperature of 40° C.–80° C. for at least 30 minutes. If no polar microstructure modifier was present during the polymerization, it may be desireable to add a non-reactive coordinating agent, such as diethyl ether or glyme, during this step.

The polymers of the present invention preferably comprise saturated or unsaturated polybutadiene or polyisoprene. When the polymer comprises polymerized 1,3-butadiene which contains residual monomer unsaturation which is to be saturated by hydrogenation, the anionic polymerization of the conjugated diene hydrocarbons is typically controlled with structure modifiers such as diethyl ether or glyme (1,2-diethoxyethane) to obtain the desired amount of 1,4-addition. As described in Re 27,145 which is incorporated by reference herein, the level of 1,2-addition of a butadiene polymer or copolymer can greatly affect elastomeric properties after hydrogenation. The hydrogenated polymers exhibit improved heat stability and weatherability in the final sealant, coating, molded or extruded product or fiber.

The 1,2-addition of 1,3-butadiene polymers having terminal functional groups influences the viscosity of the polymers. A 1,2-addition of about 40% is achieved during polymerization at 50° C. with about 6% by volume of diethyl ether or about 1000 ppm of glyme.

Hydrogenation of at least 90%, preferably at least 95%, of the unsaturation in low molecular weight butadiene polymers is achieved with nickel catalysts as described in U.S. Pat. Nos. Re. 27,145 and 4,970,254 and U.S. patent application Ser. No. 07/785715 which are incorporated by reference herein. The preferred nickel catalyst is a mixture of nickel 2-ethylhexanoate and triethylaluminum described in more detail in the examples. It is preferable to extract the nickel catalyst after hydrogenation by stirring the polymer solution with aqueous phosphoric acid (20–30 percent by weight), at a volume ratio of about 0.5 parts aqueous acid to 1 part polymer solution, at about 50° C. for 30–60 minutes while sparging with a mixture of oxygen in nitrogen.

Sufficient IPA must be present during deprotection of the protected functional groups to prevent the formation of a discrete aqueous phase. Excess acid is then removed by washing with dilute aqueous base, preferably 0.1N–0.5N sodium hydroxide, followed by water. For some applications, such as coatings prepared by baked cures of the polymer with amino resins in the presence of a strong organic acid catalyst, it may be preferable to use the polymer in its "protected" form. The viscosity of the protected polymer is lower and conditions such as those described above should accomplish the deprotection (generate the alcohol) during the cure.

The heterotelechelic polymers produced as described above have utility as components in polyurethane, polyester, polyamide, polyacrylate, polycarbonate and epoxy formulations to modify the surface energy of sealants, coatings, molded or extruded articles or fibers. Polymers suitable for modification with these heterotelechelic polymers are generally condensation polymers including polyamides, polyurethanes, vinyl alcohol polymers, vinyl ester polymers, polysulfones, polycarbonates and polyesters, including those, like polylactones, which have a recurring ester linkage in the molecule, and those, like polyalkylene arylates, including polyalkylene terephthalates, having a structure formed by polycondensation of a dicarboxylic acid with a glycol. The heterotelechelic polymer may be incorporated into the blends in a reactor or in a post compounding step. Preparation of a polyurethane coating using the heterotelechelic polymers of the present invention is described in more detail below.

DETAILED DESCRIPTION OF PREFERRED EMBODIMENTS

A preferred embodiment of the present invention is a linear 1,3-butadiene polymer having a protected functional group, most preferably a trimethylsilyl ether group, at one end of the polymer backbone and a fluorocarbon group resulting from capping with a perfluoroalkylchlorosilane on the other end of the polymer backbone. The preferred 1,3-butadiene polymers have a peak molecular weight from 500 to 200,000, most preferably from 500 to 20,000. The butadiene polymers are most preferably saturated with 1,2-addition from 30% to 70% to provide maximum elasticity.

The polymers of the present invention are particularly useful as low surface energy components in making sealants (such as urethane architectural sealants, etc.), coatings (such as topcoats for automotive, polyester coil coatings, alkyd maintenance coatings, release coatings for pressure sensitive adhesives, water repellant coatings for fabrics, etc.), films (such as those requiring low surface tension), molded and extruded thermoplastic and thermoset parts (for example thermoplastic injection molded polyurethane rollers or reaction injection molded thermoset auto bumper, facie, etc.).

The terminal perfluoroalkyl group which is on the heterotelechelic polymer imparts reduced surface energy to the products into which it is incorporated. This result has been observed in polyurethane coatings of polyhydroxylated compounds and isocyanates wherein the heterotelechelic polymers react with the coating through the terminal hydroxyl group as shown in the examples below.

EXAMPLES

The polymer molecular weights were measured using gel permeation chromatography (GPC) calibrated with polybutadiene standards having known molecular weights. The solvent for the GPC analyses was tetrahydrofuran. The capping efficiency and the extent of 1,2-addition of polybutadiene were measured by $^{13}C$ NMR in chloroform solution.

Initiator Synthesis

The t-butyldimethylsilyl initiator used in the experiments is described in U.S. patent application Ser. No. 155,665, filed Nov. 22, 1993 (TH0010), which description is incorporated by reference herein. A more preferred trimethylsilyl initiator was discovered after completion of the following polymerizations and is described in U.S. patent application Ser. No. 220,804, filed Mar. 31, 1994 (TH0404), which description is incorporated by reference herein.

The experimental initiator has the structure

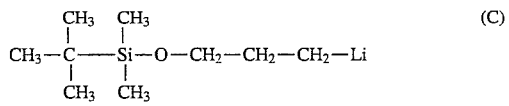

(C)

which is produced by silylation of 3-chloro-1-propanol by reaction with t-butyldimethylsilyl chloride (TBDMS-Cl) in the presence of imidazole, followed by reaction with lithium metal. The concentration of active lithium alkyl was determined by titration with diphenylacetic acid, as described by W. G. Korfron and L. M. Baclawski (*J. Org. Chem*, 41(10), 1879 (1976)).

EXAMPLE 1

A linear polybutadiene polymer having a target number average molecular weight of 6,000 was prepared with the initiator of equation C using the procedure described in U.S. patent application Ser. No. 155,665, filed Nov. 22, 1993 (TH0010), which description is incorporated by reference herein. Prior to termination with methanol the polymer was capped with about 2 equivalents of heptafluorobutraldehyde added as a 50% solution in THF. The capping reaction continued for one hour at 41° C. The heptafluorobutraldehyde was obtained by dehydrating the corresponding commercial hydrate over phosphorus pentoxide.

A portion of the capped polymer was terminated with methanol and deprotected using methanesulfonic acid, water, and isopropanol as described in the '665 application which description is incorporated by reference herein. The polymer was analyzed for number average molecular weight by GPC and capping efficiency by $^{13}C$ NMR.

The measured number average molecular weight was 6,500 which shows good initiation efficiency. The capping efficiency was about 42% as a result of incomplete dehydration of the commercial hydrate.

NMR analysis indicated that 39% by weight of the polymer was a heterotelechelic polymer having both a terminal hydroxyl group and a terminal perfluoroalkyl group.

EXAMPLE 2

A linear polybutadiene polymer having a target number average molecular weight of 3,500 was prepared with the initiator of equation C using the procedure described in U.S. patent application Ser. No. 155,665, filed Nov. 22, 1993 (TH0010), which description is incorporated by reference herein. Prior to termination with methanol the polymer was capped by adding about 1.1 equivalents of 1H,1H,2H,2H-perfluorodecyldimethylchlorosilane; the capping reaction continued for one hour at 41° C. A portion of the capped polymer was terminated with methanol and deprotected using methanesulfonic acid, water, and isopropanol as described in the '665 application which description is incorporated by reference herein. The polymer was analyzed for number average molecular weight by GPC and capping efficiency by $^{13}C$ NMR.

The measured number average molecular weight was 3,900 which shows good initiation efficiency. The capping efficiency was about 90%.

NMR analysis indicated that 81% by weight of the polymer was a heterotelechelic polymer having both a terminal hydroxyl group and a terminal perfluoroalkyl group.

EXAMPLE 3

A linear polybutadiene polymer having a target number average molecular weight of 3,500 was prepared with the initiator of equation C using the procedure described in U.S. patent application Ser. No. 155,665, filed Nov. 22, 1993 (TH0010), which description is incorporated by reference herein. Prior to termination with methanol the polymer was capped with about 1.1 equivalents of 1H,1H,2H,2H-perfluorodecyldimethylchlorosilane; the capping reaction continued for one hour at 41° C. A portion of the capped polymer was terminated with methanol as described in the '665 application which description is incorporated by reference herein. The polymer was analyzed for number average molecular weight by GPC and capping efficiency by $^{13}C$ NMR.

The measured number average molecular weight was 4,200 which shows good initiation efficiency. The capping efficiency was about 90%.

A portion of the capped polymer cement was washed with 20% aqueous phosphoric acid, and then water, and the solvent was stripped off in a rotary evaporator. This product was dissolved to a concentration of 10% wt. in cylcohexane and hydrogenated with a solution of Ni/Al catalyst as described in U.S. patent application Ser. No. 155,665, filed Nov. 22, 1993 (TH0010), which description is incorporated by reference herein. The hydrogenation catalyst was prepared in advance by reacting nickel 2-ethylhexanoate with triethylaluminum in cyclohexane in amounts sufficient to give a ratio of about 2.5 moles of aluminum to 1 mole of nickel. Sufficient catalyst solution was added to bring the nickel concentration to 100 ppm. After peaking at about 90°

C., the temperature decreased and was held at about 70° C. Analysis for residual unsaturation (by ozone titration) indicated about 99% conversion after 30 minutes. The catalyst was extracted by washing the cement with 20% aqueous phosphoric acid.

The capped, hydrogenated polymer was deprotected using methanesulfonic acid, water, and isopropanol as described in the '665 patent and NMR analysis indicated that 85% by weight of the polymer was a heterotelechelic polymer having both a terminal hydroxyl group and a terminal perfluoroalkyl group.

Comparison Example A

An unsaturated monohydroxylated polybutadiene having a number average molecular weight of 3900 was prepared by polymerizing 1,3-butadiene with s-butyllithium and capping the polymer with ethylene oxide. The capping efficiency was about 99%.

EXAMPLE 4

The heterotelechelic polymers of examples 1–3 and comparison example A were used to modify an acrylic polyurethane coating comprising a polyol and an isocyanate. The polyol was JONCRYL 510 (from S. C. Johnson), a 500 hydroxy equivalent weight acrylic polyol at 80% wt solids. The isocyanate was DESMODUR Z-4370 (Miles), a trifunctional isocyanurate based on isophorone diisocyanate having 365 equivalent weight at 70% wt solids. All materials were dried over 4A molecular sieves before use.

Coatings were cast from 70% wt solutions onto 75×150 mm steel panels (D36 panels, Q-Panel Corp) using a No. 40 wire rod. Since the polybutadiene polymers were incompatible with JONCRYL 510 but compatible with DESMODUR Z-4370, the polybutadiene polymers were mixed with the isocyanate for 1 day on a bottle roller before combining with the acrylic and coating panels. The coatings were prepared at 1.1/1 NCO/OH ratio. About 0.1% wt dibutyltindilaurate (DABCO T-12, Air Products) was used in each coating to catalyze the hydroxyl-isocyanate reaction. The coatings were cured at ambient temperature for 3 weeks prior to testing. All the coatings had a clear, smooth, and high gloss appearance. Dry film thickness of the coatings was about 25 microns.

Initial screening showed that the polymers of Examples 2 and 3 were effective in reducing critical surface energy of the acrylic urethane coating. The coatings made from the polymers of Example 1 and comparison example A did not show measurable change in the critical surface energy. Thus, coatings were prepared from Examples 2 and 3 with 2% and 5% by weight of each of the heterotelechelic polymers to determine any relationship with surface energy. A coating containing the polymer of Example 2 was further prepared with 10% by weight of the heterotelechelic polymer. The coatings of Example 1 and comparison Example A were prepared only with 10% by weight of the polymers to see if any effect on surface energy could be detected.

The components of the coatings of Examples 1–2 and Comparison Example A are shown in Table 1 with and without solvents. The components of the coatings of Example 3 are shown in Table 2.

TABLE 1

|  | 1c | 2 | 3 | 4 | 5 | 6c |
|---|---|---|---|---|---|---|
| Composition in Solvent % wt. | | | | | | |
| JONCRYL 510 | 48.7 | 44.2 | 47.8 | 46.5 | 44.2 | 44.2 |
| DESMODUR Z-4370 | 35.6 | 32.3 | 34.9 | 33.9 | 32.3 | 32.3 |
| Example 1 | | 6.4 | | | | |
| Example 2 | | | 1.3 | 3.2 | 6.4 | |
| Comp. Ex. A | | | | | | 6.4 |
| DABCO T-12 | .06 | .06 | .06 | .06 | .06 | .06 |
| 2-Heptanone | 15.7 | 17.1 | 16.0 | 16.4 | 17.1 | 17.1 |
| Composition of Dry Coating wt % | | | | | | |
| Acrylic polyol | 61.0 | 54.9 | 59.7 | 57.9 | 54.9 | 54.9 |
| Isocyanate | 38.9 | 35.0 | 38.2 | 37.0 | 35.0 | 35.0 |
| Example 1 | | 10.0 | | | | |
| Example 2 | | | 2.0 | 5.0 | 10.0 | |
| Comparison A | | | | | | 10.0 |
| DABCO T-12 | 0.1 | 0.1 | 0.1 | 0.1 | 0.1 | 0.1 |

TABLE 2

|  | 1c | 7 | 8 |
|---|---|---|---|
| Composition in Solvent pbw | | | |
| JONCRYL 510 | 500 | 500 | 500 |
| DESMODUR Z-4370 | 365 | 365 | 365 |
| Example 3 | | 13.4 | 34.5 |
| DABCO T-12 | .66 | .67 | .69 |
| 2-Heptanone | 161 | 167 | 176 |
| Composition of Dry Coating wt % | | | |
| Acrylic polyol | 61.0 | 59.7 | 57.9 |
| Isocyanate | 38.9 | 38.2 | 37.0 |
| Example 3 | | 2.0 | 5.0 |
| DABCO T-12 | 0.1 | 0.1 | 0.1 |

The surface energies of the coatings were determined by measuring the wetting propeties of nonpolar liquids having known surface tension. A Rame-Hart contact angle goniometer was used to make the contact angle measurements. For each coating-liquid combination, contact angles were measured at least three times. A standard deviation of approximately one degree was obtained for the measurements. For the coatings in Table 1, contact angles with five liquids were measured. The cosine of the contact angles were plotted vs the surface tension of the liquids to yield a value of the critical surface tension of the coatings.

Coating 1c in Table 1 which did not contain a monohydroxy polymer additive had a critical surface tension in the range of 38–40 dynes/cm. Not surprisingly, this value agrees well with the critical surface tension of other acrylic polymers such as polymethylmethacrylate, which has a value equal to 39 dynes/cm.

Coating 3 in Table 1 containing the heterotelechelic polymer of Example 2 had a critical surface tension of only 20–24 dynes/cm. Thus, use of relatively small amounts of this fluoroalkyl capped polybutadiene polymer was successful in making the acrylic urethane coating less wettable to potential nonpolar contaminants. For comparison, the critical surface tension of polytetrafluoroethylene is 19 dynes/cm. Increasing the concentration of the Example 2 polymer above 2% wt in the coating only slightly decreased the critical surface tension.

The polymers of Example 1 and Comparison Example A had much less of an effect on the surface energy of the acrylic urethane coating. Both of these polymers resulted in practically no change in the critical surface tension of the coating.

Contact angles for the coatings in Table 2 were measured with only two liquids, hexadecane and methyl iodide, and so extrapolation to determine critical surface tension was not possible. Advancing contact angles measured for hexadecane on Coatings 1c, 7 and 8 in Table 2 were 0, 10 and 7, respectively, and for methyl iodide were 48, 64 and 68, respectively. These results with both liquids clearly show a higher contact angle for Coatings 7 and 8, showing the coatings containing the polymer of Example 3 are less wettable than the unmodified Coating 1c.

The present invention is defined by the following claims and is not limited to the described examples, although the examples may support one or more of the claims.

We claim:

1. A process for making heterotelechelic polymers, comprising the steps of:

anionically polymerizing a polymer comprising a conjugated diene with a protected functional initiator; and capping the polymer with a low surface energy fluorocarbon compound selected from a group consisting of perfluoroaldehydes, perfluoroketones, and perfluoroalkylsilanes.

2. The process of claim 1, wherein the fluorocarbon compound is a perfluoroalkylchlorosilane.

3. The process of claim 1, wherein the fluorocarbon compound is 1H,1H,2H,2H-perfluorodecyldimethylchlorosilane.

4. The process of claim 1, wherein the protected functional initiator is a trimethylsilyl initiator.

5. The process of claim 1, further comprising the step of hydrogenating the polymer.

6. The process of claim 1, further comprising the step of deprotecting the polymer to form a hydroxyl group on one end of the polymer.

* * * * *